United States Patent
Fukumoto et al.

(10) Patent No.: US 10,994,456 B2
(45) Date of Patent: May 4, 2021

(54) ROTARY MOLD TYPE INJECTION MOLDING MACHINE AND METHOD FOR EXCHANGING MOLD OF ROTARY MOLD TYPE INJECTION MOLDING MACHINE

(71) Applicant: Kabushiki Kaisha Meiki Seisakusho, Aichi (JP)

(72) Inventors: Kenji Fukumoto, Aichi (JP); Tsuyoshi Miyaki, Aichi (JP); Shizuo Jinno, Aichi (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 115 days.

(21) Appl. No.: 15/670,182

(22) Filed: Aug. 7, 2017

(65) Prior Publication Data

US 2018/0056558 A1   Mar. 1, 2018

(30) Foreign Application Priority Data

Aug. 23, 2016   (JP) .............................. JP2016-162421

(51) Int. Cl.
*B29C 45/04*   (2006.01)
*B29C 45/06*   (2006.01)
(Continued)

(52) U.S. Cl.
CPC ............ *B29C 45/045* (2013.01); *B29C 45/06* (2013.01); *B29C 45/162* (2013.01); *B29C 45/1756* (2013.01)

(58) Field of Classification Search
CPC ....... B29C 66/71; B29C 49/36; B29C 45/045; B29C 45/12
(Continued)

(56) References Cited

U.S. PATENT DOCUMENTS

| 4,457,689 A * | 7/1984 | Aoki ....................... B29C 49/28 |
| | | 264/538 |
| 4,472,127 A * | 9/1984 | Cyriax .................. B29C 31/006 |
| | | 264/328.7 |

(Continued)

FOREIGN PATENT DOCUMENTS

| CN | 201511497 | 6/2010 |
| CN | 203622751 | * 11/2013 |

(Continued)

OTHER PUBLICATIONS

WO2012111381 Patentscope Translated Claims (Year: 2012).*
WO2012111381 Patentscope Translated Description (Year: 2012).*
CN203622751 Machine Translation (Year: 2013).*

*Primary Examiner* — Francisco W Tschen
*Assistant Examiner* — Guy F Mongelli
(74) *Attorney, Agent, or Firm* — Renner, Otto, Boisselle & Sklar, LLP (57) ABSTRACT

A rotary mold type injection molding machine and a method for exchanging molds of a rotary mold type injection molding machine. The rotary mold type injection molding machine includes a fixed platen, a movable platen which is opened and closed in a horizontal direction with respect to the fixed platen, and a rotary table to which a plurality of molds is mounted and which is rotatably provided on one of the fixed platen and the movable platen. The rotary mold type injection molding machine further includes: a mold member which is configured of a plurality of molds and mold mounting plates to which the plurality of molds is mounted; and a mounting portion which is provided on the rotary table provided on one of the fixed platen and the movable platen and on which the mold mounting plate is mounted when the mold member is fixed.

13 Claims, 3 Drawing Sheets

(51) Int. Cl.
*B29C 45/16* (2006.01)
*B29C 45/17* (2006.01)

(58) Field of Classification Search
USPC .................................................. 425/192 R
See application file for complete search history.

(56) References Cited

U.S. PATENT DOCUMENTS

| | | | |
|---|---|---|---|
| 4,702,685 A * | 10/1987 | Fruntzek | B29C 45/1756 425/182 |
| 4,805,285 A * | 2/1989 | Reyes | B29C 31/006 29/407.1 |
| 4,993,474 A * | 2/1991 | Uchida | B29C 45/06 164/326 |
| 5,030,406 A | 7/1991 | Sorensen | |
| 5,049,343 A | 9/1991 | Sorensen | |
| 5,249,947 A * | 10/1993 | Inaba | B29C 45/73 425/150 |
| 5,302,105 A * | 4/1994 | Bertleff | B29C 45/1756 425/190 |
| 7,086,848 B2 | 8/2006 | Bischer et al. | |
| 7,134,869 B2 * | 11/2006 | Lichtinger | B29C 45/1628 425/576 |
| 7,220,118 B2 * | 5/2007 | Nishizawa | B29C 45/062 425/130 |
| 7,553,439 B1 * | 6/2009 | Hughes | B29C 45/1744 264/328.7 |
| 8,454,342 B2 | 6/2013 | Mathy, Jr. et al. | |
| 8,814,553 B2 | 8/2014 | Mathy, Jr. et al. | |
| 2001/0051193 A1 * | 12/2001 | Lichtinger | B29C 45/1628 425/576 |
| 2004/0076701 A1 | 4/2004 | Lai | |
| 2006/0051452 A1 * | 3/2006 | Woller | B29C 45/045 425/556 |
| 2007/0052117 A1 * | 3/2007 | Arnet | B29D 11/00432 264/1.1 |
| 2008/0026097 A1 * | 1/2008 | Glashagen | B29C 45/045 425/592 |
| 2011/0180294 A1 * | 7/2011 | Qin | B29C 45/06 174/50 |
| 2013/0249144 A1 * | 9/2013 | Carlson | B29C 45/68 264/328.8 |
| 2014/0077410 A1 * | 3/2014 | Takatsugi | B29C 45/162 264/161 |
| 2014/0265016 A1 * | 9/2014 | Nguyen | B29D 35/0081 264/255 |
| 2015/0321401 A1 * | 11/2015 | Schad | B29C 45/1742 264/39 |
| 2016/0167274 A1 * | 6/2016 | Zipse | B29C 45/1628 425/589 |

FOREIGN PATENT DOCUMENTS

| | | | | |
|---|---|---|---|---|
| DE | 3836986 A1 * | 5/1990 | | B29C 45/17 |
| JP | 5153556 | 5/1976 | | |
| JP | 5619251 | 5/1981 | | |
| JP | 02022019 | 1/1990 | | |
| JP | 02029309 | 1/1990 | | |
| JP | 07000321 | 1/1990 | | |
| JP | 03007315 | 1/1991 | | |
| JP | 05077245 | 3/1993 | | |
| JP | 05138683 | 6/1993 | | |
| JP | 06134807 | 5/1994 | | |
| JP | 966543 | 3/1997 | | |
| JP | 10502022 | 2/1998 | | |
| JP | 10128796 | 5/1998 | | |
| JP | 2001026039 | 1/2001 | | |
| JP | 200450780 | 2/2004 | | |
| JP | 2004195654 | 7/2004 | | |
| JP | 2005067034 | 3/2005 | | |
| JP | 2005138367 | 6/2005 | | |
| JP | 2007276261 | 10/2007 | | |
| JP | 3146519 | 10/2008 | | |
| JP | 2011042098 | 3/2011 | | |
| JP | 2011056774 | 3/2011 | | |
| JP | 2012183778 | 9/2012 | | |
| JP | 2012224008 | 11/2012 | | |
| JP | 2013188998 | 9/2013 | | |
| JP | 2014168848 | 9/2014 | | |
| WO | WO-2006106035 A1 * | 10/2006 | | B29C 45/045 |
| WO | WO-2006106036 A1 * | 10/2006 | | B29C 45/045 |
| WO | WO-2008043641 A1 * | 4/2008 | | B29C 45/045 |
| WO | WO-2012111381 A1 * | 8/2012 | | B29C 45/162 |

* cited by examiner

ROTARY MOLD TYPE INJECTION MOLDING MACHINE AND METHOD FOR EXCHANGING MOLD OF ROTARY MOLD TYPE INJECTION MOLDING MACHINE

CROSS REFERENCE TO RELATED APPLICATIONS

This application claims the priority benefit of Japanese Patent Application No. 2016-162421, filed on Aug. 23, 2016. The entirety of the above-mentioned patent application is hereby incorporated by reference herein and made a part of this specification.

BACKGROUND

1. Technical Field

The present invention relates to a rotary mold type injection molding machine including a fixed platen, a movable platen which is opened and closed in a horizontal direction with respect to the fixed platen, and a rotary table to which a plurality of molds is mounted and which is rotatably provided on one of the fixed platen and the movable platen, and a method for exchanging molds of a rotary mold type injection molding machine.

2. Related Art

JP 2007-276261 A (Claim 1, 0003, 0018, FIG. 1) discloses a known rotary mold type injection molding machine (horizontal rotary mold type injection molding machine) in which a movable platen is opened and closed in a horizontal direction with respect to a fixed platen and a rotary table provided with a plurality of molds is rotatably provided on one of the fixed platen and the movable platen. JP 2007-276261 A (Claim 1, 0003, 0018, FIG. 1) discloses that a large mold is mounted without increasing the size of the rotary table by fixing a mold mounting plate to the rotary table. It is understood that the mold mounting plate is always fixed to the rotary table, and the mold is mounted on the mold mounting plate upon mold exchange in JP 2007-276261 A (Claim 1, 0003, 0018, FIG. 1). However, JP 2007-276261 A (Claim 1, 0003, 0018, FIG. 1) does not disclose at all how to mount the mold on the mold mounting plate.

In addition, JP 2013-188998 A (Claim 1, 0035, FIG. 5) discloses a known mold exchange way in a lateral rotary mold type injection molding machine. JP 2013-188998 A (Claim 1, 0035, FIG. 5) does not disclose that a mold is fixed to a mold mounting plate, but discloses that a plurality of molds is exchanged by means of a crane or the like. As a result, it requires time and skill to exchange a plurality of molds by using a crane.

Further, JP 7-321 B (Claim 1, Advantageous Effect of Invention, FIGS. 1 and 2) discloses a known rotary type injection molding machine in which a plurality of sets of molds are mounted on mold mounting plates and the mold mounting plates are exchanged. JP 7-321 B (Claim 1, Advantageous Effect of Invention, FIGS. 1 and 2) discloses that, by using the mold mounting plate, mold mounting work can be performed in a shorter time than in a conventional rotary type injection molding machine.

SUMMARY

However, JP 7-321 B (Claim 1, Advantageous Effect of Invention, FIGS. 1 and 2) relates to a vertical rotary type injection molding machine in which a movable platen is lifted and lowered with respect to a lower fixed platen, and the mold mounting plate can be horizontally moved and carried onto the lower fixed platen. Accordingly, movement and attachment and detachment of the mold mounting plate can be carried out under minimal influence of gravity. In contrast, in a case of a horizontal rotary mold type molding machine, even if a mold is carried in and mounted in a state where the mold mounting plate is attached to the mold, the mold mounting plate or the like cannot be mounted completely on one of the platens and the mold mounting plate is always affected by gravity. Therefore, it is difficult to maintain posture of the mold mounting plate until the mold mounting plate has been carried in or mounted. Therefore, JP 7-321 B (Claim 1, Advantageous Effect of Invention, FIGS. 1 and 2) cannot be diverted immediately to a method for exchanging molds of a horizontal rotary mold type injection molding machine. Also, attachment work of temperature control liquid piping or the like after a mold is mounted in the vertical rotary mold type molding machine as disclosed in JP 7-321 B (Claim 1, Advantageous Effect of Invention, FIGS. 1 and 2) totally differs from the attachment work in a horizontal rotary mold type molding machine. Therefore, in this respect as well, it is impossible to immediately divert JP 7-321 B (Claim 1, Advantageous Effect of Invention, FIGS. 1 and 2) to a method for exchanging molds of a horizontal rotary mold type injection molding machine.

Accordingly, in view of the above problems, an object of the present invention is to provide a rotary mold type injection molding machine including a fixed platen, a movable platen which is opened and closed in a horizontal direction with respect to the fixed platen, and a rotary table to which a plurality of molds is mounted and which is rotatably provided on one of the fixed platen and the movable platen, the rotary mold type injection molding machine being capable of relatively easily exchanging molds in a short time, and to provide a method for exchanging molds of the rotary mold type injection molding machine.

A first aspect of the present invention provides a rotary mold type injection molding machine including: a fixed platen; a movable platen which is opened and closed in a horizontal direction with respect to the fixed platen; and a rotary table to which a plurality of molds is mounted and which is rotatably provided on one of the fixed platen and the movable platen, the rotary mold type injection molding machine further including: a mold member which is configured of a plurality of molds and a mold mounting plate to which the plurality of molds is mounted; and a mounting portion which is provided on the rotary table of the fixed platen or movable platen and on which the mold mounting plate is mounted when the mold member is fixed.

A second aspect of the present invention provides the rotary mold type injection molding machine according to the first aspect, wherein the mounting portion is a mold-member moving mechanism which moves the mold member in the horizontal direction, and carrying-in or carrying-out of the mold member is performed from between upper and lower tie bars on at least one of an operation side or a side opposite to the operation side.

A third aspect of the present invention provides a method for exchanging molds of a rotary mold type injection molding machine including: a fixed platen; a movable platen which is opened and closed in a horizontal direction with respect to the fixed platen; and a rotary table to which a plurality of molds is mounted and which is rotatably provided on one of the fixed platen and the movable platen, the rotary mold type injection molding machine further including a mold member which is configured of a plurality of molds that are mounted on a mold mounting plate on a rotary table side and on a mold mounting plate on a side opposite to the rotary table side, the method including positioning and fixing the mold member on the rotary table in a state where at least the mold mounting plate on the rotary table side in the mold member is mounted on a mounting portion of the rotary table.

A fourth aspect of the present invention provides the method for exchanging molds of a rotary mold type injection molding machine according to the third aspect, further including carrying in and fixing the mold member to the rotary table in a state where two rotary molds are aligned in a vertical direction of the mold mounting plate on the rotary table side.

A fifth aspect of the present invention provides the method for exchanging molds of a rotary mold type injection molding machine according the third or fourth aspect, wherein mold mounting plate, which are exchanged, on the rotary table side are identical to each other in a distance from a rotation center to a placement surface.

The rotary mold type injection molding machine according to the present invention includes a fixed platen, a movable platen which is opened and closed in a horizontal direction with respect to the fixed platen, and a rotary table to which a plurality of molds is mounted and which is rotatably provided on one of the fixed platen and the movable platen. The rotary mold type injection molding machine further includes a mold member which is configured of a plurality of molds and a mold mounting plate to which the plurality of molds is mounted, and a mounting portion which is provided on the rotary table of the fixed platen or movable platen and on which the mold mounting plate is mounted when the mold member is fixed. Therefore, the rotary mold type injection molding machine can relatively easily exchange a plurality of molds in a short time. Also, the method for exchanging molds of the rotary mold type injection molding machine has a similar effect.

DETAILED DESCRIPTION

Figure 1:
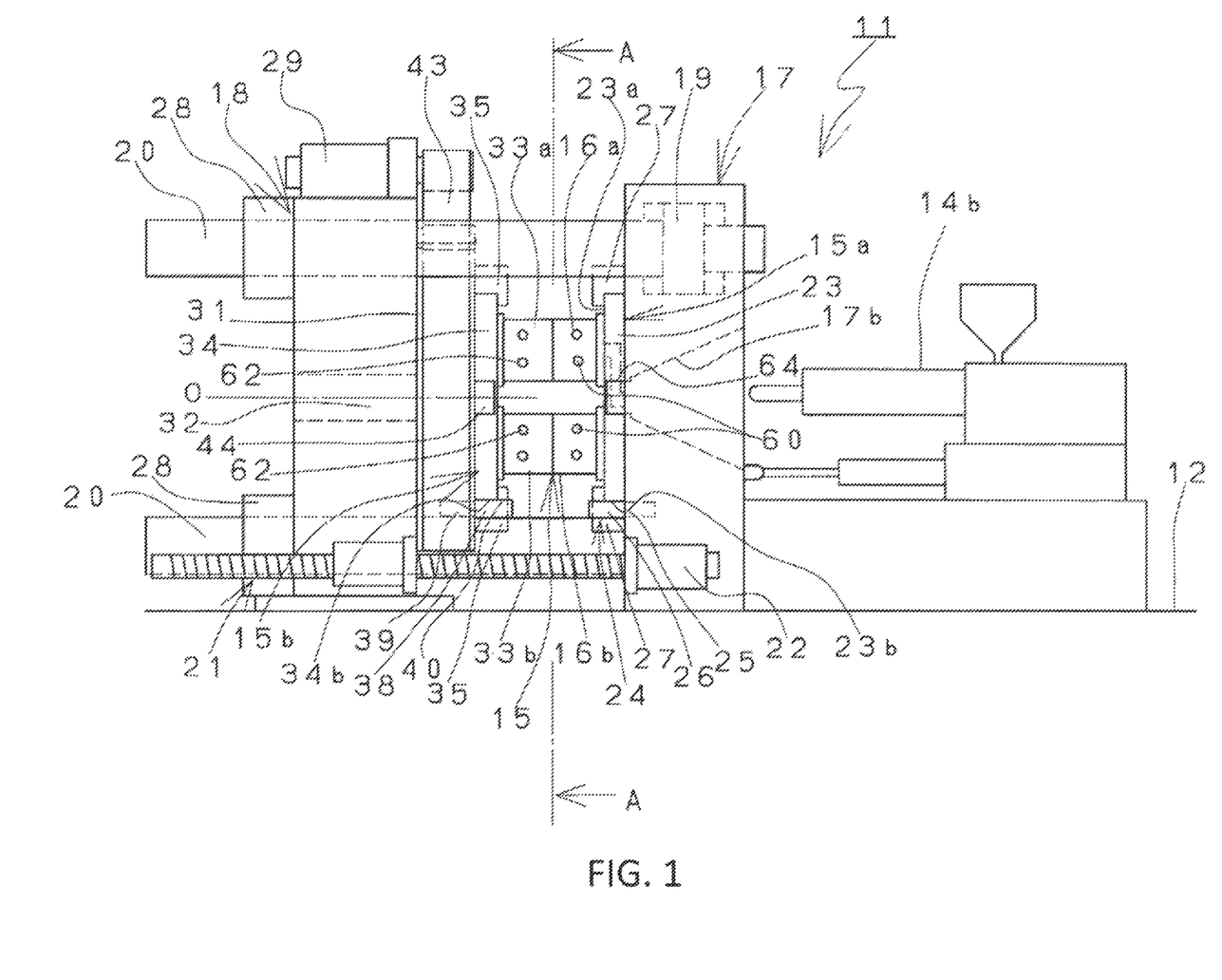
FIG. 1 is a side view of a rotary mold type injection molding machine according to a present embodiment when a mold is closed.
Figure 2:
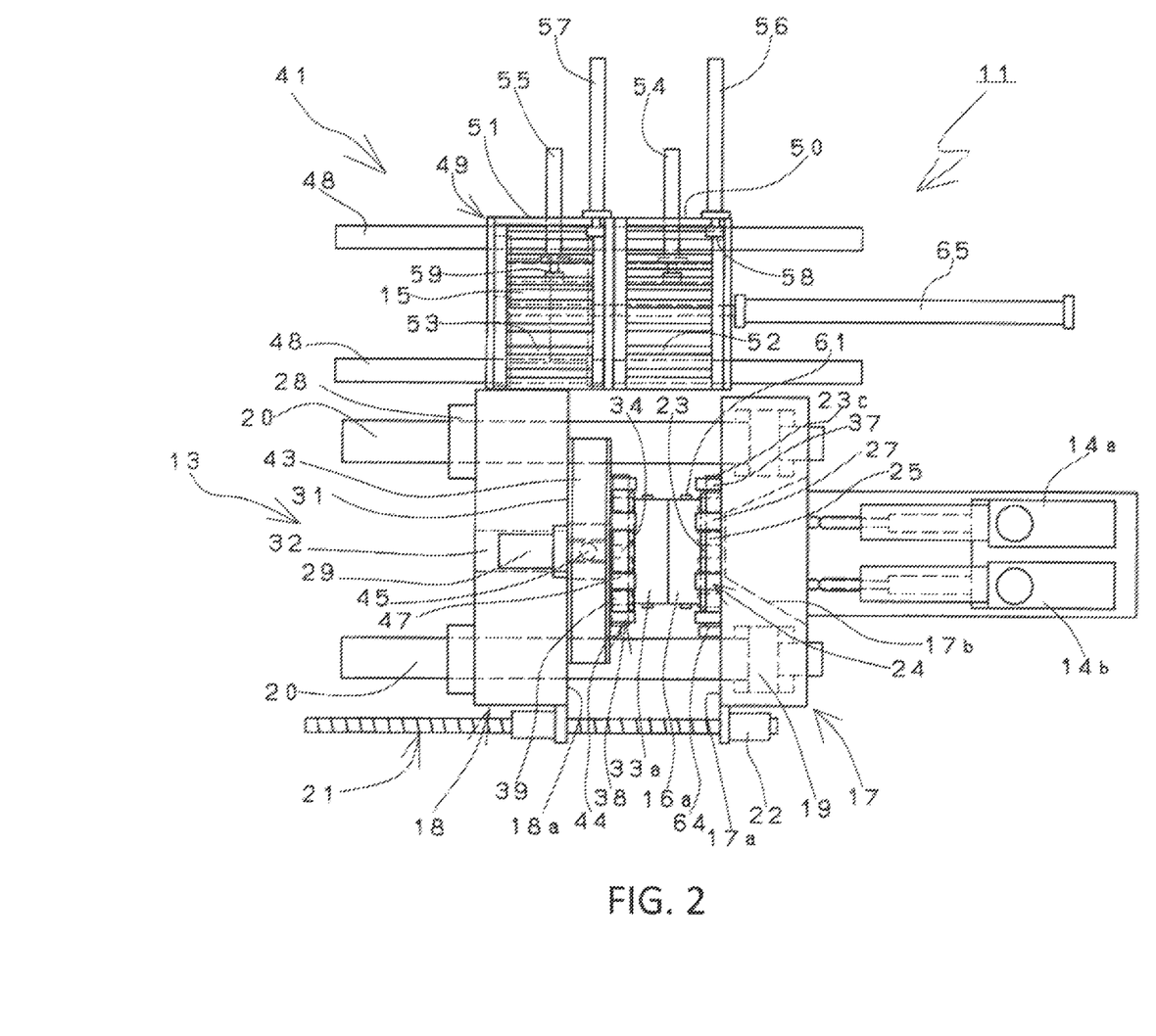
FIG. 2 is a plan view of the rotary mold type injection molding machine including a mold member exchange mechanism according to the present embodiment upon mold member exchange.
Figure 3:
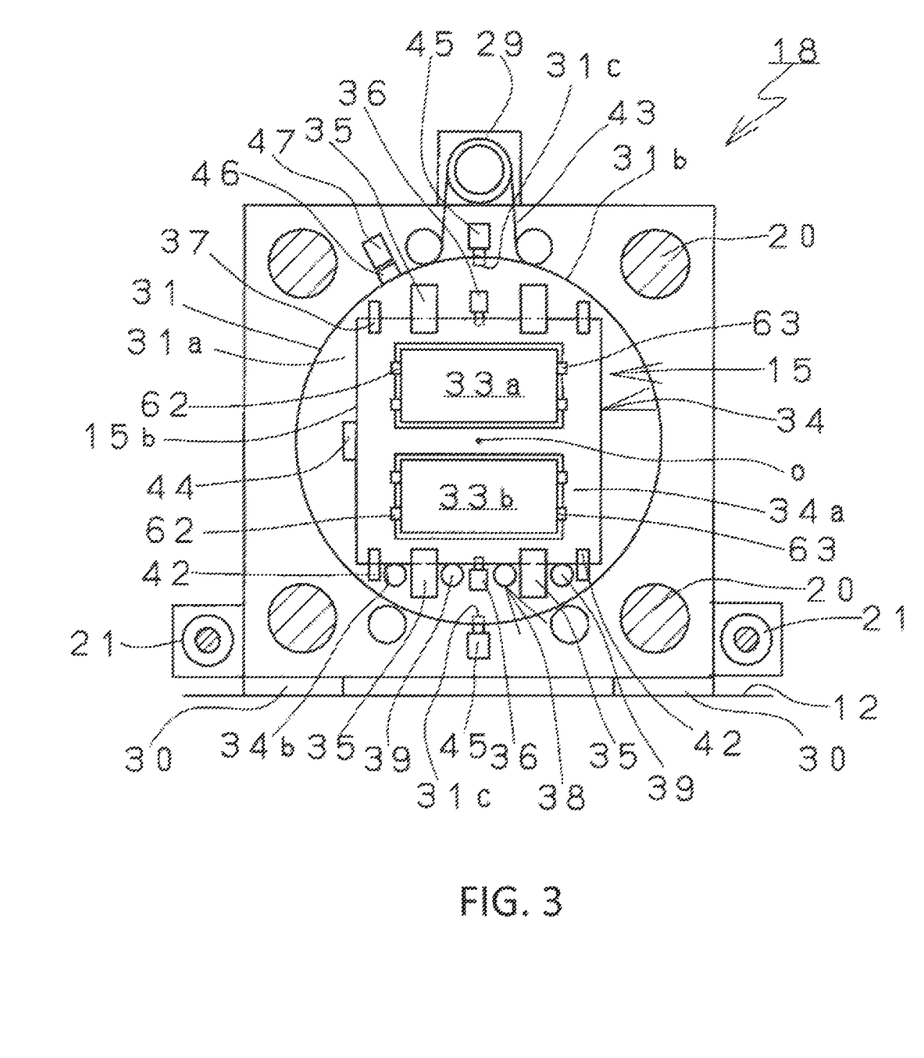
FIG. 3 is a view taken along the line A-A in FIG. 1.

An outline of a rotary mold type injection molding machine according to an embodiment of the present invention will be described with reference to FIGS. 1 to 3. A rotary mold type injection molding machine 11 according to the present invention is basically configured of a mold clamping device 13 provided on one side in the longitudinal direction on a base 12, and injection devices 14a, 14b provided on the other side in the longitudinal direction on the base 12. The rotary mold type injection molding machine 11 includes a fixed platen which is fixedly provided on the base 12 of the mold clamping device 13, a movable platen 18 which is opened and closed in the horizontal direction with respect to the fixed platen, and a rotary table 31 to which a plurality of molds 33a and 33b is mounted and which is rotatably provided on one of the fixed platen 17 and the movable platen 18.

Next, the mold member 15 of the rotary mold type injection molding machine 11 will be described. In the present embodiment, two fixed molds 16a and 16b are fixed to a front face 23a of a mold mounting plate 23 with bolts or the like, and the fixed molds 16a, 16b and the mold mounting plate 23 together constitute a mold member 15a on a fixed platen side (the other side of a rotary table side). Two rotary molds 33a and 33b are fixed to a front surface 34a of a mold mounting plate 34 on the rotary table side with bolts or the like, and the rotary molds 33a and 33b and the mold mounting plate 34 together constitute a mold member 15b on the rotary table side. The mold member 15 to be integrally exchanged is configured of the mold members 15a and 15b. The mold member 15a is configured of the fixed molds 16a and 16b joined together. The mold member 15b is configured of the rotary molds 33a and 33b joined together. Lower surfaces of the mold mounting plates 23 and 34 serve as placement surfaces 23b and 34b when the two molds 16a, 16b, and 33a, 33b are carried in and mounted such that the molds are aligned in the vertical direction of the mold mounting plates 23 and 34. Then, in a state in which the mold members 15a and 15b are mounted on the mold-member moving mechanism 24 serving as a mounting portion of the fixed platen 17 and the mold-member moving mechanism 38 serving as the mounting portion of the rotary table 31 in the above state, the mold member 15 is positioned and fixed. Therefore, the rotary molds 33a and 33b constituting one of the plurality of molds are indirectly mounted to the rotary table 31 via the mold mounting plate 34. The fixed molds 16a and 16b constituting the other of the plurality of molds are also indirectly mounted to the fixed platen 17 via the mold mounting plate 23.

On the mold mounting plate 23 on the fixed platen side, holes into which nozzles of the two injection devices 14a and 14b can be inserted or a nozzle touch surface is formed. In the present embodiment, a hot runner is also formed inside the mold mounting plate 23, and hot runners in the fixed molds 16a and 16b mounted in the vertical direction via the mold mounting plate 23 connects to the nozzle touch surface positioned in the horizontal direction upon mounting of the mold mounting plate 23 via the hot runner in the mold mounting plate 23.

A connecting port 60 for a temperature control liquid hose is provided on a surface of each of the fixed molds 16a and 16b, directed to an operation side (a lower side of the mold clamping device in FIG. 2) when the mold member 15a on the fixed platen side is fixed to the fixed platen 17, and a connecting port 61 for hydraulic piping of a hydraulic core is provided on a surface of each of the fixed molds 16a and 16b, directed to a side opposite to the operation side (an upper side of the mold clamping device in FIG. 2) when the mold member 15a on the fixed platen side is fixed to the fixed platen 17. Therefore, a worker can easily install and remove the temperature control liquid hose and the hydraulic piping from the operation side or the side opposite to the operation side. With regard to the fixed mold 16a and the fixed mold 16b, the connecting port 60 for the temperature control liquid hose and the connecting port 61 for the hydraulic piping may be provided on either the operation side or the side opposite to the operation side, or may be provided on an identical side.

A connecting port 62 for a temperature control liquid hose is provided on a surface of each of the rotary molds 33a and 33b, directed to the operation side when the rotary molds 33a and 33b are fixed to the rotary table 31 via the mold mounting plate 34, and a connecting port 63 for hydraulic piping of a hydraulic core is provided on a surface of each of the rotary molds 33a and 33b, directed to the side opposite to the operation side when the rotary molds 33a and 33b are fixed to the rotary table 31 via the mold mounting plate 34. That is, by providing the connecting port 62 for the temperature control liquid hose and the connecting port 63 for the hydraulic piping of the hydraulic core on surfaces of each of the rotary molds 33a and 33b which become side surfaces when the mold member 15 is mounted, work of installing and removing the hose and the piping by a worker is easily performed from the operation side or the side opposite to the operation side. With regard to the rotary mold 33a and the rotary mold 33b, the connecting port 62 for the temperature control liquid hose and the connecting port 63 for the hydraulic piping may be provided on either the operation side or the side opposite to the operation side, or may be provided on an identical side. Also, in a case where solenoid valves and various sensors are provided in the fixed molds 16a and 16b or the rotary molds 33a and 33b, it is preferable that receptacles of signal wires of the solenoid valves or the various sensors be provided on surfaces which become side surfaces when the mold member 15 is mounted. Further, in a case where, for example, only the temperature control liquid hose is connected, the connecting port may be provided only on one of the surfaces which becomes a side surface when the mold is mounted, and the connecting port may be provided at least on one of the side surfaces.

In the present embodiment, the mold mounting plate 23 placed on the fixed platen 17 and the mold mounting plate 34 placed on the rotary table 31 have identical shapes and identical areas. Also, with respect to mold members 15 prepared for exchange in order to mold different molded articles, it is preferable to use mold mounting plates 23 and 34 having identical shapes and identical areas. Particularly, even if there is a slight difference in shape among the mold mounting plates 34 on the rotary table side, it is preferable that distances from the rotation centers O to the placement surfaces 34b of the mold mounting plates 34 be identical. Therefore, when the mold mounting plates 23, 34 are mounted on the mounting portion of the fixed platen 17 and the mounting portion of the rotary table 31, it is possible to hold the mold in an appropriate position with respect to the platens. Note that the number of molds fixed to the mold mounting plate 34 on the rotary table side and the mold mounting plate 23 on the other side in the mold member 15 is not limited as long as the number is plural. Further, a plurality of mold members 15 each having a plurality of molds mounted on the mold mounting plates may be fixed to the rotary table 31.

The injection devices 14a, 14b are known injection devices, and normally two injection devices are provided in parallel for the purpose of injecting different materials. Note that arrangement of the injection devices is not limited to the arrangement illustrated in FIG. 2. For example, one of the injection devices may be provided next to the mold clamping device such that a nozzle of the injection device is directed toward a mold, or multiple (e.g., at least three) injection devices may be provided.

With respect to the mold clamping device 13, mold clamping cylinders 19 of a mold clamping mechanism are provided near the four corners of the fixed platen 17, respectively, and a rod of each mold clamping cylinder 19 serves as a tie bar 20. Therefore, as illustrated in FIG. 3, two upper tie bars 20 and two lower tie bars 20 are provided. On the base 12 (or the fixed platen 17), a servomotor 22 of a mold opening and closing mechanism 21 is fixed and a ball screw is pivotally supported. In contrast, a ball nut of the mold opening and closing mechanism 21 is fixed to the movable platen 18, and a ball screw is inserted into the ball nut. The movable platen 18 can be opened and closed in the horizontal direction with respect to the fixed platen 17. (In FIG. 1, the mold opening and closing mechanism 21 on the side opposite to the operation side is omitted.) A rotary mold type injection machine as disclosed in the present invention where the movable platen 18 is moved in the horizontal direction is likely to require less molding cycle time and less power than a rotary mold type injection machine in which a movable platen is moved up and down in the vertical direction. The mold clamping mechanism may be a different mechanism such as a toggle mechanism, and the mold opening and closing mechanism 21 may be a different mechanism such as a hydraulic cylinder or the like. In the present invention, the rotary mold type injection molding machine is configured of the mold clamping device 13, the injection devices 14a and 14b, the mold member 15, and the like.

Recessed holes 17b and 17c into which the nozzles of the two injection devices 14a and 14b can be inserted are formed on a surface of the fixed platen 17 on the side facing the injection devices. In addition, especially as illustrated in FIG. 1, the mold-member moving mechanism 24 capable of moving the mold member 15 in the horizontal direction is provided on a lower portion of the mold-member mounting surface 17a of the fixed platen 17. The mold-member moving mechanism 24 is configured of a plurality of rolling rollers 25 arranged in line in the horizontal direction. The rolling rollers 25 are provided with a support shaft that protrudes by a fixed length in a direction perpendicular to the mold-member mounting surface 17a of the fixed platen 17, and a roller 26 is rotatably mounted to the support shaft. The placement surface 23b (lower surface) of the mold mounting plate 23 can be placed on the upper surface of the roller 26. Accordingly, the mold-member moving mechanism 24 of the fixed platen 17 also serves as a mounting portion on which the mold mounting plate 23 on the fixed platen side is mounted when the mold is mounted.

The rolling rollers 25 of the mold-member moving mechanism 24 are provided at locations lower than the center of the fixed platen 17 such that a line connecting upper surfaces of the rollers 26 is slightly above a line connecting upper surfaces of the two lower tie bars 20 and 20. Four rolling rollers 25 are illustrated here; however, arrangement and the number of rolling rollers 25 are not limited. In addition, a bearing may be provided in the fixed platen 17 and the entire rollable roller may rotate. Furthermore, the mold-member moving mechanism 24 is not limited to a mechanism including the rolling rollers 25. The mold-member moving mechanism 24 may include a rolling ball, a sliding plate having a high lubricity, or the like.

A hydraulic clamp device 27, which is a fixing mechanism for the mold member 15a on the fixed platen side, is provided at each of two locations on the upper side and two locations on the lower side of the mold-member mounting surface 17a of the fixed platen 17. The mold mounting plate 23 is fixed to the fixed platen 17 by a total of four hydraulic clamp devices 27. The fixing mechanism for fixing the mold mounting plate 23 to the fixed platen 17 may be an electromagnetic lock type clamp device, a magnetic clamp device using an electromagnet, a fixing mechanism for fixing the mold mounting plate 23 by bolts or the like in addition to the hydraulic clamp device 27. A stopper member 64 for positioning the inserted mold member 15 is provided at a location closer to the operation side on the mold-member mounting surface 17a of the fixed platen 17.

With respect to the movable platen 18, the tie bars 20 are inserted into holes near the four corners of the movable platen 18, respectively. A half nut 28 is provided near each of the four corners on a back surface 18b of the movable platen 18, and can be engaged with and disengaged from a locking groove, not illustrated, of each of the tie bars 20. An ejector mechanism, not illustrated, is provided on the back side of the movable platen 18. When forward rotation by 180° and reverse rotation by 180° of the rotary mold 33a and rotary mold 33b are performed such that the rotary mold 33a and the rotary mold 33b are aligned in the vertical direction as illustrated in FIG. 3, the ejector mechanism is preferably provided on the back of the stop position of the upper rotary mold 33. That is, in comparison to a usual configuration where a take-out machine, not illustrated, is mounted on an upper surface of the fixed platen or the like, it is possible to shorten a molded-article takeout stroke of the takeout machine, and it is possible to shorten a molding cycle time. Further, on the upper surface of the movable platen 18, a servomotor 29 of a rotary mechanism for rotating the rotary table 31 is mounted. Furthermore, on the lower surface of the movable platen 18, a guide block 30 and the like for sliding the movable platen 18 on the base 12 are provided.

Further, the rotary table 31 is rotatably provided (the term "rotatably provided" involves rotating by a certain angle, stopping the rotation, and then rotating in a reverse direction) on the surface 18a of the movable platen 18 facing the fixed platen (the surface facing the fixed platen 17, which is the other platen). The rotary table 31 is a disc-shaped plate having a fixed thickness, and a cylindrical rotary shaft 32 is fixed at the center of the rotary table 31 such that the cylindrical rotary shaft 32 extends away from the fixed platen. The rotary shaft 32 of the rotary table 31 is inserted into a through hole at the center of the movable platen 18 via a bearing or bush, not illustrated. Accordingly, the rotary table 31 is rotated about the horizontal axis. The rotary molds 33a and 33b can be mounted on a mold-member mounting surface 31a (surface facing the fixed platen 17 which corresponds to the other one of the fixed platen and the movable platen) of the rotary table 31. In the present embodiment, the two rotary molds 33a and 33b are mounted on the mold-member mounting surface 31a of the rotary table 31 via the mold mounting plate 34 on the rotary table side.

A hydraulic clamp device 35, which is a fixing mechanism of the mold member 15b on the rotary table side, is provided at each of two positions on one side and two positions on the other side with respect to the rotation center O (the center of the rotation shaft 32) of the rotary table 31. The mold mounting plate 34 is fixed to the mold-member mounting surface 31a of the rotary table 31 by a total of four hydraulic clamp devices 35. Here, the fixing mechanism of the mold mounting plate 34 which is the mold member 15b is the hydraulic clamp devices 35; however, the fixing mechanism may be another mechanism similarly to the case of the fixed platen. Between the upper hydraulic clamp devices 35 and 35, an air cylinder of a mold mounting plate positioning and fixing mechanism 36 is provided. A recessed portion is formed at the center on the placement surface 34b of the mold mounting plate. When the rod of the air cylinder is fitted into the recessed portion, the mold mounting plate 34 is positioned in the right-left direction upon mounting. Further, on the outside of the hydraulic clamp devices 35 and 35, guide plates 37 are provided for guiding the mold mounting plate 34 during horizontal movement and for preventing lifting of the mold mounting plate 34.

Further, on one side of the mold-member mounting surface 31a with respect to the rotation center O of the rotary table 31, the mold-member moving mechanism 38 is provided. The mold-member moving mechanism 38 is configured of a plurality of rolling rollers 39 arranged in line in the chord direction with respect to the rotation center O of the rotary table 31. The rolling roller 39 is provided with a support shaft protruding by a fixed length in a direction perpendicular to the mold-member mounting surface 31a, and a roller 40 is rotatably mounted on the support shaft. The placement surface 34b (lower surface) of the mold mounting plate 34 of the mold member 15 can be placed on the upper surface of the roller 40. Accordingly, the mold-member moving mechanism 38 of the rotary table 31 also serves as a mounting portion on which the mold mounting plate 34 on the rotary table side is placed. However, each of the mold-member moving mechanism 24 (mounting portion) of the fixed platen 17 and the mold-member moving mechanism 38 (mounting portion) of the rotary table 31 is not limited to rolling rollers, and may be a receiving portion configured of a member fixedly protruding from the platen or the like.

The rolling rollers 39 are provided on the mold-member mounting surface 31a of the rotary table 31 such that when the rotary table 31 is stopped in a state where the mold-member moving mechanism 38 is located at the lowermost position with respect to the rotation center O, the line connecting the upper surfaces of the rollers 40 of the rolling rollers 39 is located slightly above the line connecting the upper surfaces of the lower tie bars 20 and 20. Even though four rolling rollers 39 are illustrated here, the arrangement and the number of rolling rollers 39 are not limited. Also, the structure of the rollable roller is not limited to the rolling roller 39. Further, the mold-member moving mechanism 38 of the rotary table 31 is not limited to the mechanism including the rolling rollers 39, and the mold-member moving mechanism 38 may include a rolling ball, a sliding plate with high lubricity, or the like. Between the rolling rollers 39, 39, the air cylinder of the mold mounting plate positioning and fixing mechanism 36 is provided. In addition, guide plates 42 are provided outside the rolling rollers 39 (note that the guide plates 37, 42, and 47 are not illustrated in FIG. 1).

In the present embodiment, the rolling rollers 39, the hydraulic clamp devices 35, the air cylinder of the mold mounting plate positioning and fixing mechanism 36, and the guide plates 42 are arranged in line in an identical chord direction on one side of the mold-member mounting surface 31a with respect to the rotation center O of the rotary table 31. More specifically, the hydraulic clamp device 35 is sandwiched between the rolling rollers 39. In addition, the air cylinder is sandwiched between the rolling rollers 39. Further, the upper surface of the roller 40 of the rolling roller 39 and the guide surface of the guide plate 42 orthogonal to the mold-member mounting surface 31a are located at an identical height, and the guide plate 42 also constitutes part of the mold-member moving mechanisms 38 (mounting portion). However, the guide plate 42 is not indispensable.

Further, a stopper member 44 is fixed to the mold-member mounting surface 31a on the side opposite to the side where the mold member 15 is carried in when the rotary table 31 is stopped for exchange of the mold members 15. The stopper member 44 is a member which is brought into contact with and positions the mold mounting plate 34 of the mold member 15 installed on the movable platen 18 from the side opposite to the operation side.

Temperature control liquid piping and the hydraulic piping, not illustrated, are inserted into the cylindrical rotary shaft 32 of the rotary table 31. The temperature control liquid piping and the hydraulic piping are connected to the connecting ports 62 and 63 of the rotary molds 33a and 33b via the mold mounting plate 34. Teeth are formed on an outer peripheral portion 31b of the rotary table 31 so as to mesh with a timing belt 43 that rotates the rotary table 31. The timing belt 43 is wound around both a drive pulley of the servomotor 29 for rotating the rotary table, provided on the movable platen 18, and the teeth formed on the outer peripheral portion 31b of the rotary table 31. A rotary mechanism of the rotary table 31 is not limited to the above. In addition, the movable platen 18 may be provided with a mechanism for moving forward the rotary table 31 by a certain amount or a mechanism for guiding rotation when the rotary table 31 is rotated.

Holes 31c are provided at locations 180° apart with respect to the rotation center O (symmetrical locations) on the outer peripheral portion 31b of the rotary table 31 or at locations on the back surface of the rotary table 31 closer to the outer peripheral side. A positioning pin is inserted into each hole 31c. In addition, rotary table fixing mechanisms 45 each including a hydraulic cylinder and a positioning pin mounted on a rod of the cylinder are provided on locations in an upper part and a lower part of the surface 18a of the movable platen 18 facing the fixed platen, the locations adjacent to the rotary table 31 or facing the back surface of the rotary table 31. In addition, a marker 46 such as a cam is provided near one of the holes 31c of the rotary table 31 into which the positioning pins are inserted. A detection mechanism 47 such as a proximity switch which detects the marker such as the cam is provided near the rotary table fixing mechanism 45 of the movable platen 18. The marker 46 and the detection mechanism 47 constitute a mechanism for checking a first molding position and a second molding position upon molding. The mechanism also functions as a mechanism for checking a mold member exchangeable stop position of the rotary table 31. When the proximity switch detects the cam, it is detected that the rotary table 31 is stopped such that the mold-member moving mechanism 38 is in a horizontal state at a location lower than the rotation center O and the rotary table 31 is in the mold member exchangeable stop position. Note that a rotation angle may be detected only by a rotary encoder of the servomotor 29 in order to check whether or not the rotary table 31 is in the mold member exchangeable stop position.

Next, a mold member exchange mechanism 41 for exchanging the mold members 15 (a plurality of molds and the mold mounting plates 23 and 34) will be described with reference to FIG. 2. Two rails 48 are provided parallel to a mold opening and closing direction on a lateral side of the rotary mold type injection molding machine 11 (here, the side opposite to the operation side). A mold member exchange carriage 49 is movable on the rails 48 in the mold opening and closing direction by a hydraulic cylinder 65, which is a moving mechanism. Note that the moving mechanism of the mold member exchange carriage 49 is a self-propelled motor and may be mounted on the mold member exchange carriage 49 or may be self-propelled from the vicinity of a mold shelf. The mold member exchange carriage 49 is provided with a carry-out stage 50 for unloading the mold member 15 which has been molded and a carry-in stage 51 for placing the mold member 15 to be molded next time. The carry-out stage 50 and the carry-in stage 51 are provided with rolling rollers 52, 53 on the upper surfaces, respectively. In addition, the mold member exchange carriage 49 is provided with a moving mechanism such as a hydraulic cylinder 54 for advancing and retracting the carry-out stage 50 toward and from the rotary mold type injection molding machine 11, and a moving mechanism such as a hydraulic cylinder 55 for advancing and retreating the carry-in stage 51 toward and from the rotary mold type injection molding machine 11. Further, the carry-out stage 50 is provided with a transfer mechanism such as a hydraulic cylinder 56 for carrying out the mold member 15 which has been molded. In addition, the carry-in stage 51 is provided with a transfer mechanism such as a hydraulic cylinder 57 for carrying in the mold member 15 to be molded next. Mold member connecting portions 58 and 59 for connecting to the mold member 15 are mounted on front ends of rods of the hydraulic cylinders 56 and 57, respectively.

Note that the mold member exchange mechanism 41 is not limited to what is described above. A mold member exchange base installed on a lateral side of the mold clamping device 13 such that the mold member exchange base is not movable may be provided in lieu of the mold member exchange carriage 49. In the mold member exchange carriage 49 or the mold member exchange base, the carry-out stage 50 can be used for carrying in the mold member 15, and the carry-in stage 51 can be used for carrying out the mold member. In addition, the carry-out stage 50 and the carry-in stage 51 may be incapable of moving in a direction orthogonal to the mold opening and closing direction. In that case, it is possible to provide a bridging passage for moving the mold member 15. The bridging passage is provided between the rotary mold type injection molding machine 11 and the mold member exchange carriage 49 and is made of a separate member. It is also possible to provide rolling rollers outside the tie bars 20 of the fixed platen 17 and the movable platen 18. Further, each of the mold member exchange carriage 49 and the mold member exchange base may be provided with a placement surface for only one mold member 15.

Next, a molding method performed by using the rotary mold type injection molding machine 11 will be described. When the mold member 15 is mounted on the fixed platen 17 and the rotary table 31 of the movable platen 18 of the mold clamping device 13 to perform molding, the servomotor 29 is actuated by an instruction from a control device, not illustrated, and the rotary table 31 is positioned at the first molding position and is stopped. When the mold is closed and clamped, the injection device 14a injects a resin into a cavity formed by joining the fixed mold 16a and the rotary mold 33a together. At the same time or before or after the above injection, another resin in injected from the injection device 14b into a cavity formed by the fixed mold 16b and the rotary mold 33b. After molten resin in each cavity is cooled and solidified, the mold is opened and a molded article made of two materials is taken out from the rotary mold 33b, the servomotor 29 is driven to rotate the rotary table 31 and the mold member 15b by 180°, and the rotary molds 33a and 33b are rotationally moved to the second molding position. The rotary table 31 is stopped by positioning control of the servomotor 29, and the both positioning pins of the rotary table fixing mechanisms 45 are inserted. Then, when the mold is closed and clamped again, the injection device 14a injects a resin into a cavity formed by joining the fixed mold 16a and the rotary mold 33b together, and the injection device 14b injects another resin into a cavity formed by joining the fixed mold 16b and the rotary mold 33a together. Next, when the mold is opened after molten resin in each cavity is cooled and solidified, a molded article made of two materials is taken out from the rotary mold 33a. Then, the servomotor 29 is driven again to rotate (reversely rotate) the rotary table 31 and the mold member 15b by 180°, the rotary molds 33a and 33b are moved to the first molding position, and molding is repeated in the same manner. In the present embodiment, when the rotary table 31 is in the first molding position, the rotary table 31 is in a mold member exchangeable stop position where the rolling rollers 39 of the mold-member moving mechanism 38 are stopped below the rotation center O.

Next, a method for exchanging molds of the rotary mold type injection molding machine 11 will be described. As illustrated in FIG. 2, the mold member exchange carriage 49 is stopped at a mold member exchange position (carry-out position) where the carry-out stage 50 for unloading the mold member 15 which has been molded faces straight a space between the fixed platen 17 and the movable platen 18 when the mold is closed. Further, on the carry-in stage 51 next to the carry-out stage 50, the mold member 15 to be used for the next molding is placed. When continuous molding is completed and a worker selects a mold member exchange mode on an operation panel of the rotary mold type injection molding machine 11, the rotary table 31 is stopped by positioning control such that the mold-member moving mechanism 38 faces the other mold-member moving mechanism 24 of the fixed platen 17 as illustrated in FIG. 3, and the mold members 15 are exchanged. More specifically, the encoder of the servomotor 29 detects the rotational position (angle) of the rotary table 31 and the proximity switch of the detection mechanism 47 detects the marker 46 such as a cam. Thus, the rotary table 31 is reliably stopped such that the mold-member moving mechanism 38 is in a horizontal state at a location below the rotation center O. Then, the positioning pins of the rotary table fixing mechanisms 45 are inserted into the holes 31c of the rotary table 31, and the rotary table 31 is immovably fixed to the movable platen 18.

In the present embodiment, an interlock circuit is configured such that exchange operation of the mold members 15 can be started only when it is detected that rotary table 31 is stopped in the mold member exchange position where the rolling rollers 39, which are the mold-member moving mechanism of the rotary table 31, are located lower than the rotation center O of the rotary table 31. More specifically, whether exchange operation of the mold members 15 can be started is determined by checking only information of the encoder of the servomotor 29 or checking whether the positioning pins are inserted in addition to checking of the information of the encoder. Next, the movable platen 18 is moved forward by the mold opening and closing mechanism 21, and the rotary molds 33a are 33b are closed with respect to the fixed molds 16a and 16b. In this state, connecting members such as the temperature control liquid hoses and the hydraulic piping of the hydraulic cores which are connected to the mold (the fixed molds 16a, 16b, and the rotary molds 33a, 33b) are detached from the connecting ports 60, 61, 62, and 63.

Next, clamping of the mold mounting plate 23 by the hydraulic clamp devices 27, which configure the fixing mechanism of the mold member of the fixed platen 17, is stopped. At the same time, clamping of the mold mounting plate 34 by the hydraulic clamp devices 35, which configure the fixing mechanism of the mold member 15b on the movable platen to which the rotary table 31 is mounted, is stopped. Then, the movable platen 18 is slightly moved in a direction for opening the mold. As a result, a slight gap is formed between the mold-member mounting surface 17a of the fixed platen 17 and the mold mounting plate 23, and a slight gap is also formed between the mold-member mounting surface 31a of the rotary table 31 and the mold mounting plate 34. The procedure of removing the connecting members such as the temperature control liquid hoses and the procedure of releasing clamping are not limited to what is described above.

Next, the hydraulic cylinder 54 of the moving mechanism of the mold member exchange carriage 49 is actuated to move forward the carry-out stage 50 to a location near the lower tie bars 20 of the rotary mold type injection molding machine 11. At that time, the carry-out stage 50 and the mold-member moving mechanisms 24 and 38 are disposed at substantially identical heights. Then, the rod of the hydraulic cylinder 56 of the transfer mechanism of the carry-out stage 50 is moved forward, and the mold member connecting portion 58 provided at the front end of the rod is connected to a transfer mechanism connecting portion 23c of the mold mounting plate 23 of the mold member 15. However, the mold member 15 may be connected to another portion. Then, the rod of the hydraulic cylinder 56 is retracted and the entire mold member 15 is horizontally moved on the rolling rollers 25 and 39 toward the side opposite to the operation side. Then, the moving mechanism causes the entire mold member 15 on the rolling rollers 25 and 39 to pass between the upper and lower tie bars 20, 20 on the side opposite to the operation side, pass above the mold opening and closing mechanism 21, and move onto the rolling rollers 53 of the carry-out stage 50. When the entire mold member 15 is moved to a fixed position on the carry-out stage 50, the hydraulic cylinder 56 is actuated and the carry-out stage 50 is retracted to a fixed position on the mold member exchange carriage 49.

Next, the hydraulic cylinder 65 of the moving mechanism of the mold member exchange carriage 49 is actuated, and the mold member exchange carriage 49 is moved in a mold closing direction (direction toward the injection devices 14a and 14b). Then, the carry-in stage 51 of the mold member exchange carriage 49 is stopped at the mold member exchange position (carry-in position) of the carriage facing straight the space between the fixed platen 17 and the movable platen 18. Next, the hydraulic cylinder 55 of the moving mechanism is actuated, and the carry-in stage 51 on which the mold member 15 to be mounted to the molding machine next is placed is moved forward to the location near the lower tie bars 20 of the rotary mold type injection molding machine 11. At that time, the carry-in stage 51 and the mold-member moving mechanisms 24 and 38 are disposed at substantially identical heights. Then, the rod of the hydraulic cylinder 56 of the transfer mechanism of the carry-in stage 51 is moved forward to move forward the mold member 15 connected to the mold member connecting portion 59 of the rod. The mold member 15 passes between the upper and lower tie bars 20 and 20 on the side opposite to the operation side. The mold member 15 on the rolling rollers 53 of the carry-in stage 51 is guided by the guide plates 37, 42, and 47 to move in the horizontal direction on the rolling rollers 25 of the mold-member moving mechanism 24 provided on the fixed platen 17 and on the rolling rollers 39 of the mold-member moving mechanism 38 provided on the rotary table 31 of the movable platen 18.

At that time, the positional relationship of the molds in the mold member 15 is such that the mold in which the fixed mold 16a and the rotary mold 33a are joined together, and the mold in which the fixed mold 16b and the rotary mold 33b are joined together, are carried into the rotary mold type injection molding machine 11 in a state where the molds are aligned in the vertical direction with respect to the mold mounting plates 23 and 34. The molds are mounted on upper surfaces of the mold-member moving mechanism 24 (mounting portion) and the mold-member moving mechanism 38 (mounting portion). Then, with this mounted state maintained, the mold mounting plates 23 and 34 of the mold member 15 are fixed to the fixed platen 17 and the rotary table 31, respectively.

More specifically, when a side surface of the mold mounting plate 23 on a forward side (the operation side) is brought into contact with the stopper member 64 of the fixed platen 17 and a side surface of the mold mounting plate 34 on a forward side (the operation side) is brought into contact with the stopper member 44 of the rotary table 31, forward movement of the rod of the hydraulic cylinder 56 is stopped. At that time, the mold mounting plate 23 of the mold member 15 is mounted on the rolling rollers 25 of the mold-member moving mechanism 24, and the mold mounting plate 34 is mounted on the rolling rollers 39 of the mold-member moving mechanism 38. When the mounting of the mold member 15 on the rotary table 31 and the fixed platen 17 is completed, connection between the mold member connecting portion 58 provided at the front end of the rod of the hydraulic cylinder 56 and the transfer mechanism connecting portion 23c of the mold mounting plate 23 is released. Then, the rod of the hydraulic cylinder 56 is retracted, and the carry-in stage 51 is also retracted to a fixed position on the mold member exchange carriage 49 due to retraction of the rod of the hydraulic cylinder 55 of the moving mechanism.

Then, the rod of the air cylinder of the mold mounting plate positioning and fixing mechanism 36 is moved forward and fitted into the recessed portion of the mold mounting plate 34, and the mold member 15 is positioned in the horizontal direction with respect to the rotary table 31. Similarly, on the fixed platen side, the other mold mounting plate 23 may be positioned in the horizontal direction. After the above-described positioning, connection of the rod of the hydraulic cylinder 56 may be released. Next, the movable platen 18 and the rotary table 31 are slightly advanced due to actuation of the mold opening and closing mechanism 21, and the mold-member mounting surface 17a of the fixed platen 17 and the mold mounting plate 23 are completely brought into contact with each other. At the same time, the mold-member mounting surface 31a of the rotary table 31 and the mold mounting plate 34 are completely brought into contact with each other.

Then, the hydraulic clamp device 27 of the fixed platen 17 is actuated and the mold mounting plate 23 on the fixed platen side mounted on the mold-member moving mechanism (mounting portion) 24 is fixed to the mold-member mounting surface 17a of the fixed platen 17. At the same time or slightly before or after the above, the hydraulic clamp device 35 of the rotary table 31 is actuated and the mold mounting plate 34 on the rotary table side mounted on the mold-member moving mechanism (mounting portion) 38 is fixed to the mold-member mounting surface 31a of the rotary table 31.

After the mold member 15 has been mounted on the fixed platen 17 and the rotary table 31, the mold is opened again, the rotary table 31 is rotated by 180°, and the mold is closed again. Thus, it is confirmed that the fixed molds 16a and 16b and the rotary molds 33a and 33b are satisfactorily closed and fitted at both the first molding position and the second molding position. Then, the connecting members such as the temperature control liquid hoses, the hydraulic piping of the hydraulic cores, and the like are connected to the connecting ports 60, 61, 62, and 63 on the molds (the fixed molds 16a, 16b, and the rotary molds 33a, 33b) of the newly mounted mold member 15, the connecting ports 60, 61, 62, and 63 facing the operation side and the side opposite to the operation side. At that time, since a worker can attach the temperature control liquid hose or the like to the mold from lateral sides on the operation side and the side opposite to the operation side, work efficiency is good. The temperature control liquid hose or the like may be attached immediately after the mold member 15 is mounted.

In the above-described embodiment, when the mold member exchange mode is selected, control of the movable platen 18 and the mold member exchange carriage 49 other than connection of the connecting member such as the temperature control liquid hose is automatically performed through control of a control device, not illustrated. However, when the mold member exchange mode is selected, only at least part of movement control of the mold member 15 may be automatically performed by the control device, or all the operations may be manually performed by a worker. In a case of manual operation, the hydraulic cylinders 54, 55, 56, 57 and the like may be actuated by a worker pressing an operation button, and movement of the mold member 15 such as pushing and carrying-in and carrying-out the mold member 15, mounting of the mold member 15 to the platen, or the like may be manually performed.

In addition, the mold member 15 may be carried into and carried out from the rotary mold type injection molding machine 11 from between the upper and lower tie bars 20 and 20 on the operation side. Alternatively, the mold member 15 may be carried in and out from between the upper and lower tie bars 20 and 20 on both the operation side and the side opposite to the operation side. Further, upon exchange of the mold members 15, the mold member exchange position (rotation angle of the rotary table 31) of the rotary table 31 may be a position different from the molding positions (another rotation angle). For example, first, only the mold mounting plate 34 is mounted on the rotary table 31 such that the rotary molds 33a and 33b, etc. are vertically aligned. After the temperature control liquid hose and the like are attached, the rotary table 31 is rotated by 90° and then the mold mounting plate 23 on the fixed platen side is mounted to the fixed platen 17. Therefore, back surfaces of the fixed molds 16a and 16b face straight the injection devices 14a and 14b provided in the horizontal direction, which may be advantageous, for example, in a case of causing nozzles to directly touch the fixed molds 16a and 16b.

Further, in the above-described embodiment, the rotary table 31 of the rotary mold type injection molding machine 11 is rotatably provided on the movable platen 18, which is one of the platens. However, in the rotary mold type injection molding machine, the one of the platens may be the fixed platen and the rotary table rotating about a horizontal axis may be mounted on the fixed platen. Also in that case, the rotary table is stopped such that the mold-member moving mechanism of the rotary table of the fixed platen faces the mold-member moving mechanism provided on the movable platen, and the mold members 15 are exchanged. Further, even if the rotary table is provided on whichever platen, the rotary table 31 may always be rotated in an identical direction or may be forwardly rotated and then reversely rotated. When three molds are mounted on the rotary table and the rotary table is rotated by 120° each time, always being rotated in an identical direction is often desirable in order to shorten a molding cycle time or the like.

In the above-described present embodiment, the mold-member moving mechanisms 24 and 38 are fixedly provided; however, positions of the mold-member moving mechanisms 24 and 38 may be adjusted in the vertical direction. Thus, it is possible to address a case where the mold mounting plates 23 and 34 have different sizes. In a case where the heights of the mold-member moving mechanisms 24 and 38 can be adjusted, a system of changing the fixing positions of the bolts is possible as a simple system. Also, the heights of the mold-member moving mechanisms 24 and 38 may be adjusted by an actuator such as a hydraulic cylinder.

It is desirable from the viewpoint of cost and thermal expansion of the mold that only one mold-member moving mechanism 38 be provided on the rotary table 31 in the chord direction on only one side with respect to the rotation center O as described above. However, it is possible to provide two mold-member moving mechanisms 38 on one side and the other side with respect to the rotation center O of the rotary table 31. In such a case, the mold members 15 can be exchanged in a horizontal movement manner at both a stop position after the rotary table 31 is forwardly rotated by 180° and a stop position after the rotary table is reversely rotated by 180°. In the above example, it is possible to provide play such as a spring at least between the rotary table 31 and the rolling rollers 39 on one side in consideration of thermal expansion of the mold.

Furthermore, in the present invention, the mold-member moving mechanism 24 (mounting portion) provided on the fixed platen 17 is not indispensable, and the mold member 15 may be positioned and fixed to the rotary table 31 in a state where at least the mold mounting plate 34 on the rotary table side in the mold member 15 is mounted on the mold-member moving mechanism 38 (mounting portion) of the rotary table 31. However, in many cases, it is desirable to provide the mold-member moving mechanism 24 (mounting portion) on the fixed platen side.

Furthermore, in the present invention, the mold member 15 configured of the mold mounting plates 23 and 34 to which the plurality of molds is mounted may be carried in from between the two upper tie bars 20 by using a crane, or the mold member 15 configured of the mold mounting plates 23 and 34 may be carried in from between any tie bars 20 and 20 by using an articulated robot. In that case, the placement surface 23*b* of the mold mounting plate 23 on the other side of the rotary mold side in the mold member 15 is mounted on the mounting portion (positioning portion) provided on a lower portion of the fixed platen 17, and the placement surface 34*b* of the mold mounting plate 34 on the rotary table side is mounted on the mounting portion (positioning portion) provided on the rotary table 31. In this case, the mounting portion of the rotary table 31 may be a fixed receiving portion in lieu of a roller. In this state, the mold member 15 is fixed. Even in a case of using a crane or a robot, provision of the mold mounting plates according to the present invention enables to exchange molds more quickly than in a case of mounting the mold one by one. However, it often takes more time in the above case than in a case of carrying in the mold member in the horizontal direction from between the upper and lower tie bars 20.

REFERENCE SIGN LIST

11 Rotary mold type injection molding machine
15 Mold member
15*a* Mold member on fixed platen side
15*b* Mold member on rotary table side
16*a*, 16*b* Fixed mold
17 Fixed platen
18 Movable platen
20 Tie bar
23, 34 Mold mounting plate
23*b*, 34*b* Placement surface
24, 38 Mold-member moving mechanism (mounting portion)
25, 39 Rolling roller
27, 35 Hydraulic clamp device
31 Rotary table
31*a* Mold-member mounting surface
33*a*, 33*b* Rotary mold
49 Mold member exchange carriage

What is claimed is:

1. A rotary mold type injection molding machine comprising:
    a fixed platen;
    a movable platen which is opened and closed in a horizontal direction along a platen adjustment axis with respect to the fixed platen; and
    a rotary table which is rotatably provided on one of the fixed platen and the movable platen, wherein the axis of rotation of the rotary table is parallel to the platen adjustment axis,
    the rotary mold type injection molding machine further comprising:
    a mold member including
        a plurality of molds,
        a first mold mounting plate, and
        a second mold mounting plate,
        the first mold mounting plate including a first front face, a first reverse face, and a first placement surface which is a side face different from the first front face and the first reverse face,
        the second mold mounting plate including a second front face, a second reverse face, and a second placement surface which is a side face different from the second front face and the second reverse face,
        wherein the plurality of molds is mounted on the first front face of the first mold mounting plate and the second front face of the second mold mounting plate;
    a first plurality of protruding rollers provided on the rotary table and on which the first placement surface of the first mold mounting plate is mounted; and
    a second plurality of protruding rollers provided horizontally on one of the fixed platen and the movable platen to which the rotary table is not provided and on which the second placement surface of the second mold mounting plate is mounted;
    wherein the first and second plurality of protruding rollers are provided in a space between the fixed platen and the movable platen and within a region between upper and lower tie bars along which the movable platen opens and closes in the horizontal direction;
    wherein the rotary mold type injection molding machine is configured to allow performing carrying in and fixing of the mold member to the rotary table wherein two rotary molds of the plurality of molds are aligned in a vertical direction of the first mold mounting plate on the rotary table side;
    wherein the rotary table is configured to be stopped such that the first plurality of protruding rollers provided on the rotary table faces the second plurality of protruding rollers provided horizontally on one of the fixed platen and the movable platen to which the rotary table is not provided;

wherein the first plurality of the protruding rollers of the rotary table are arranged in line and provided on only one side with respect to a rotary center of the rotary table;

a guide plate and/or a clamp device configured to hold the mold member to a mold member mounting surface of the rotary table;

wherein the protruding rollers and said guide plate and/or clamp device are arranged in a horizontal line.

2. The rotary mold type injection molding machine according to claim 1, wherein wherein the rotary mold type injection molding machine is configured to allow performing carrying-in or carrying-out of the mold member from between upper and lower tie bars on at least one of an operation side or a side opposite to the operation side.

3. The rotary mold type injection molding machine according to claim 1, wherein first mold mounting plates, which are exchanged, on the rotary table side are identical to each other in a distance from a rotation center to the first placement surface.

4. A method for exchanging molds of a rotary mold type injection molding machine, the method comprising:

providing a rotary mold type injection molding machine in accordance with claim 1 and wherein the first mounting portion includes one or more protruding rollers or a protruding surface, moving the mold member in the horizontal direction on the one or more protruding rollers or protruding surface, and performing carrying-in or carrying-out of the mold member from between upper and lower tie bars on at least one of an operation side or a side opposite to the operation side.

5. A method for exchanging molds of a rotary mold type injection molding machine, the method comprising:

providing a rotary mold type injection molding machine in accordance with claim 1, and positioning and fixing the mold member on the rotary table wherein at least the first mold mounting plate on the rotary table side is mounted on the first mounting portion of the rotary table.

6. A method for exchanging molds of a rotary mold type injection molding machine, the method comprising:

providing a rotary mold type injection molding machine in accordance with claim 1, and carrying in and fixing the mold member to the rotary table wherein two rotary molds of the plurality of molds are aligned in a vertical direction of the first mold mounting plate on the rotary table side.

7. A method for exchanging molds of a rotary mold type injection molding machine, the method comprising:

providing a rotary mold type injection molding machine in accordance with claim 1, and wherein first mold mounting plates, which are exchanged, on the rotary table side are identical to each other in a distance from a rotation center to the first placement surface.

8. The rotary mold type injection molding machine according to claim 1, wherein the rotary mold type injection molding machine is configured to allow performing carrying-in or carrying-out of the mold member from between upper and lower tie bars on at least one of an operation side or a side opposite to the operation side; and a stopper member disposed on the surface of the rotary table on a side opposite to the operation side, wherein the stopper member is brought in contact with and positions the mold member carried-in the rotary mold type injection molding machine.

9. The rotary mold type injection molding machine according to claim 1, wherein the rotary table is configured to be stopped at a mold member exchange position where the first plurality of rollers of the rotary table is located below the axis of rotation of the rotary table;

a detection mechanism provided on said one of the fixed platen and the movable platen to which the rotary table is not provided, and a marker provided on the rotary table, wherein the detection mechanism is configured to detect the marker at the stop position of the rotary table at which the first plurality of protruding rollers of the rotary table is located below the axis of rotation of the rotary table.

10. The rotary mold type injection molding machine according to claim 1, wherein the rotary mold type injection molding machine is configured to enable start of a mold member exchange operation only when it is detected that the rotary table is stopped at a mold member exchange position where the one or more protruding rollers of the rotary table is located below the axis of rotation of the rotary table.

11. A method for exchanging molds of a rotary mold type injection molding machine including:

a fixed platen;

a movable platen which is opened and closed in a horizontal direction along a platen adjustment axis with respect to the fixed platen; and a rotary table which is rotatably provided on one of the fixed platen and the movable platen, wherein the axis of rotation of the rotary table is parallel to the platen adjustment axis, the rotary mold type injection molding machine further including a mold member comprising a plurality of molds, a first mold mounting plate, and a second mold mounting plate, the first mold mounting plate including the first front face, a first reverse face, and a first placement surface which is a side face different from the first front face and the first reverse face, the second mold mounting plate including the second front face, a second reverse face, and a second placement surface which is a side face different from the second front face and the second reverse face, wherein the plurality of molds is mounted on the first front face of the first mold mounting plate and the second front face of the second mold mounting plate;

a first plurality of protruding rollers provided on the rotary table and on which the first placement surface of the first mold mounting plate is mounted; and a second plurality of protruding rollers provided horizontally on one of the fixed platen and the movable platen to which the rotary table is not provided and on which the second placement surface of the second mold mounting plate is mounted;

wherein the first and second plurality of protruding rollers are provided in a space between the fixed platen and the movable platen and within a region between upper and lower tie bars along which the movable platen opens and closes in the horizontal direction;

wherein the rotary mold type injection molding machine is configured to allow performing carrying in and fixing of the mold member to the rotary table wherein two rotary molds of the plurality of molds are aligned in a vertical direction of the first mold mounting plate on the rotary table side;

wherein the rotary table is configured to be stopped such that the first plurality of protruding rollers provided on the rotary table faces the second plurality of protruding rollers provided horizontally on one of the fixed platen and the movable platen to which the rotary table is not provided;

wherein the first plurality of the protruding rollers of the rotary table are arranged in line and provided on only one side with respect to a rotary center of the rotary table;

a guide plate and/or a clamp device configured to hold the mold member to a mold member mounting surface of the rotary table;

wherein the protruding rollers and said guide plate and/or clamp device are arranged in a horizontal line, the method comprising positioning and fixing the mold member on both of the rotary table and said one of the fixed platen and the movable platen to which the rotary table is not provided, wherein at least the first placement surface of the first mold mounting plate on the rotary table side is mounted on the first plurality of protruding rollers provided on the rotary table, and the second placement surface of the second molding plate is mounted on the second plurality of protruding rollers provided on the one of the fixed platen and the movable platen to which the rotary table is not provided.

12. The method for exchanging molds of a rotary mold type injection molding machine according claim 11, wherein first mold mounting plates, which are exchanged, on the rotary table side are identical to each other in a distance from a rotation center to the first placement surface.

13. The method for exchanging molds of a rotary mold type injection molding machine according claim 11, wherein first mold mounting plates, which are exchanged, on the rotary table side are identical to each other in a distance from a rotation center to the first placement surface.

* * * * *